United States Patent
Friedrich

(10) Patent No.: US 10,715,561 B2
(45) Date of Patent: Jul. 14, 2020

(54) REANCHORING DEVICES ON SERVERS

(71) Applicant: Cisco Technology, Inc., San Jose, CA (US)

(72) Inventor: Eric Friedrich, North Easton, MA (US)

(73) Assignee: Cisco Technology, Inc., San Jose, CA (US)

(*) Notice: Subject to any disclaimer, the term of this patent is extended or adjusted under 35 U.S.C. 154(b) by 188 days.

(21) Appl. No.: 15/950,191

(22) Filed: Apr. 11, 2018

(65) Prior Publication Data

US 2019/0319991 A1 Oct. 17, 2019

(51) Int. Cl.
*H04L 29/06* (2006.01)
*H04L 29/08* (2006.01)
*H04L 29/12* (2006.01)

(52) U.S. Cl.
CPC .......... *H04L 65/1069* (2013.01); *H04L 67/02* (2013.01); *H04L 61/2007* (2013.01)

(58) Field of Classification Search
None
See application file for complete search history.

(56) References Cited

U.S. PATENT DOCUMENTS

| | | | |
|---|---|---|---|
| 8,478,883 B2 | 7/2013 | Day et al. | |
| 8,924,466 B2 | 12/2014 | Seed et al. | |
| 8,966,033 B2 | 2/2015 | Van Der Merwe et al. | |
| 9,390,063 B2 | 7/2016 | Lee et al. | |
| 2003/0212764 A1* | 11/2003 | Trossen | H04W 36/0011 709/219 |
| 2014/0156822 A1* | 6/2014 | Choi | H04L 61/303 709/223 |
| 2014/0245359 A1* | 8/2014 | De Foy | H04W 36/0011 725/62 |
| 2014/0359748 A1* | 12/2014 | Rizzo | G06F 21/10 726/10 |
| 2018/0070232 A1* | 3/2018 | Maria | H04W 4/12 |

OTHER PUBLICATIONS

Schuster, Rolf et al.; Open Edge Computing—From Vision to Reality (Jun. 2016).
Barth, A. et al.; HTTP State Management Mechanism (Apr. 2011); Internet Engineering Task Force (IETF); ISSN: 2070-1721.
Ma, Lele et al.; Effcient Service Handoff Across Edge Servers Via Docker Container Migration; In Proceedings of the Second ACM/IEEE Symposium on Edge Computing, p. 11. ACM, 2017.

* cited by examiner

*Primary Examiner* — Shirley X Zhang
(74) *Attorney, Agent, or Firm* — Merchant & Gould P.C.

(57) ABSTRACT

In one embodiment, a method, system and apparatus are described, the method including receiving an initial request from a client device, being a request to establish a connection, including an initial connection IP address of the client device, recording the initial connection IP address, receiving an additional request at the network interface, the additional request comprising a URL, an actual client IP address of the client device, and a request for streaming content, comparing the initial connection IP address with the actual client IP address, performing one of providing the streaming content in response to the additional request if the initial connection IP address and the actual client IP address are the same, or providing a response to the additional request comprising a redirect instruction if the initial connection IP address and the actual client IP address are different. Related methods, apparatus, and systems are also described.

20 Claims, 7 Drawing Sheets

REANCHORING DEVICES ON SERVERS

TECHNICAL FIELD

The present disclosure generally relates to methods and systems for reanchoring devices in a content distribution network.

BACKGROUND

Subscribers of content distribution networks (CDNs) may use mobile devices to access media and other web-based content. As subscribers move around throughout the day, their mobile devices may transition between many different networks (i.e., wireless LANs, 5G, etc.). The choice of a CDN edge server through which to retrieve content is often statically assigned at session setup time (i.e. when a subscriber starts watching a live channel or alternatively, starts viewing web-based content). As a result, mobile device on which the content is being viewed will often retrieve content from the same edge server throughout the viewing session, regardless of changes in network and location. This results in clients that are not connected to an optimal edge server based on their current location. Rather, clients remain connected to an original edge server with which their connection was originally established, and, as a result, additional traffic is caused to flow over network core and backbone links.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a method, system and apparatus are described, the method including receiving an initial request from a client device to establish a connection, the initial request including an initial connection IP address of the client device, recording the initial connection IP address, receiving an additional request at the network interface, the additional request comprising a URL, an actual client IP address of the client device, and a request for streaming content, comparing the initial connection IP address with the actual client IP address, performing one of providing the streaming content in response to the additional request if the initial connection IP address and the actual client IP address are the same, or providing a response to the additional request comprising a redirect instruction if the initial connection IP address and the actual client IP address are different. Related methods, apparatus, and systems are also described.

Exemplary Embodiment

Figure 1:
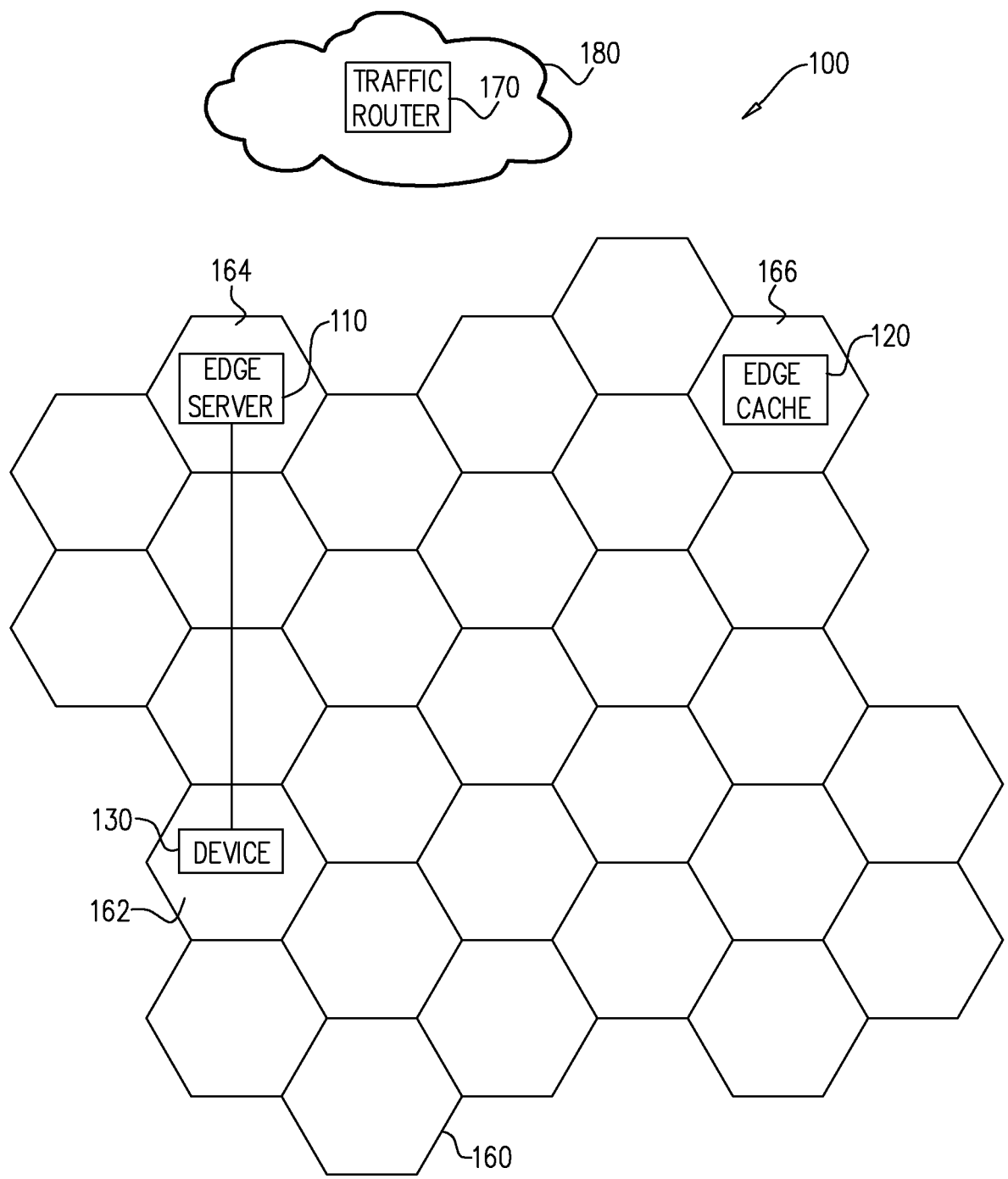
FIG. 1 is a simplified partly pictorial partly block diagram illustration, at a first point in time, of a system for reanchoring client devices of subscribers on a content distribution network (CDN) constructed and operative in accordance with a first embodiment of the present disclosure.

Reference is now made to FIG. 1, which is a simplified partly pictorial partly block diagram illustration, at a first point in time, of a system 100 for reanchoring client devices of subscribers on a content distribution network (CDN), constructed and operative in accordance with a first embodiment of the present disclosure. The system 100 includes a plurality of edge servers, such as a first edge server 110 and second edge server 120. The first edge server 110 and the second edge server 120 in a CDN typically comprise caches of content which is available for streaming to client devices, such as client device 130. In the first embodiment, as depicted in FIG. 1, the first edge server 110 is streaming content to the client device 130. Since the first edge server 110 and the second edge server 120 function as caches of content to be served to client device 130, they may also be referred to as "edge caches".

The system 100 of FIG. 1 also comprises a traffic router 170, which is part of the CDN, and may be compliant with a Cisco Open Media Distribution (OMD) platform for CDN configuration and management, as is known in the art. The Cisco OMD system, an Open Source software based system, is commercially available from Cisco Technology, Inc., 170 West Tasman Drive, San Jose, Calif., 95134-1706, USA. The traffic router 170 will be described below in greater detail, with reference to FIG. 6. In OMD systems, the traffic router 170 routes client requests to an edge server which is, at a start of a session, more optimally suited to serve the clients requests for content than other edge servers may be.

The traffic router 170 is depicted as being in a cloud 180, the cloud 180 indicating that the traffic router 170 may not be in the immediate vicinity of the client device 130, the first edge server 110 or the second edge server 120. Typically, the traffic router 170 is located at a CDN headend. The traffic router 170 may comprise a physical server, or may comprise a virtual server.

As is known in the art, in streaming video, an edge server, such as the first edge server 110 and the second edge server 120 receives a request from client devices, such as the client device 130, to access a universal resource locator (URL). When the edge server allows the client device to access the URL, a number of packets of content located at the URL are streamed to the client device. After a certain amount of time, the client device sends another request for a next number of packets of content located at a next URL, which are then streamed by the edge server to the client device, and so forth. In this way, the client device is able to receive content for serial viewing. It is appreciated that in some embodiments, the client device 130 is in communication with the first edge server 110 over a Wi-Fi network, and in some embodiments, the client device 130 is in communication with the first edge server 110 over a cellular network, as will now be discussed.

The request to access the URL is typically an HTTP request. As is known in the art, there are various versions of HTTP, for instance, HTTP version 1.1 and HTTP version 2. A UDP (User Datagram Protocol) protocol for video transfer, QUIC (Quick UDP Internet Connections), may also be used for the request to access the URL. Additionally, the request to access the URL may be sent using the Real-Time Transport Protocol (RTP) (also a UDP protocol). It is noted here that RTP does not implement cookies, and thus, embodiments described below which do not require the use of cookies (i.e., using a server-side table) may be used in RTP embodiments of the present disclosure. Other protocols may also be used to implement embodiments of the present disclosure, as appropriate. As is known in the art, a "cookie" is a specified form of client stored persistent state.

FIG. 1 is overlaid on a hexagonal grid pattern (i.e., "the grid") 160, where the hexagons in the grid 160 represent cells in a 5G cellular network. By way of example, the client device 130 is depicted as being located in a first cell 162 in the 5G cellular network or in a WiFi network; the first edge server 110 is depicted as being located in a second cell 164 in the 5G cellular network or in the WiFi network; and the second edge server 120 is depicted as being located in a third cell 166 in the 5G cellular network or in a WiFi network.

Figure 2:
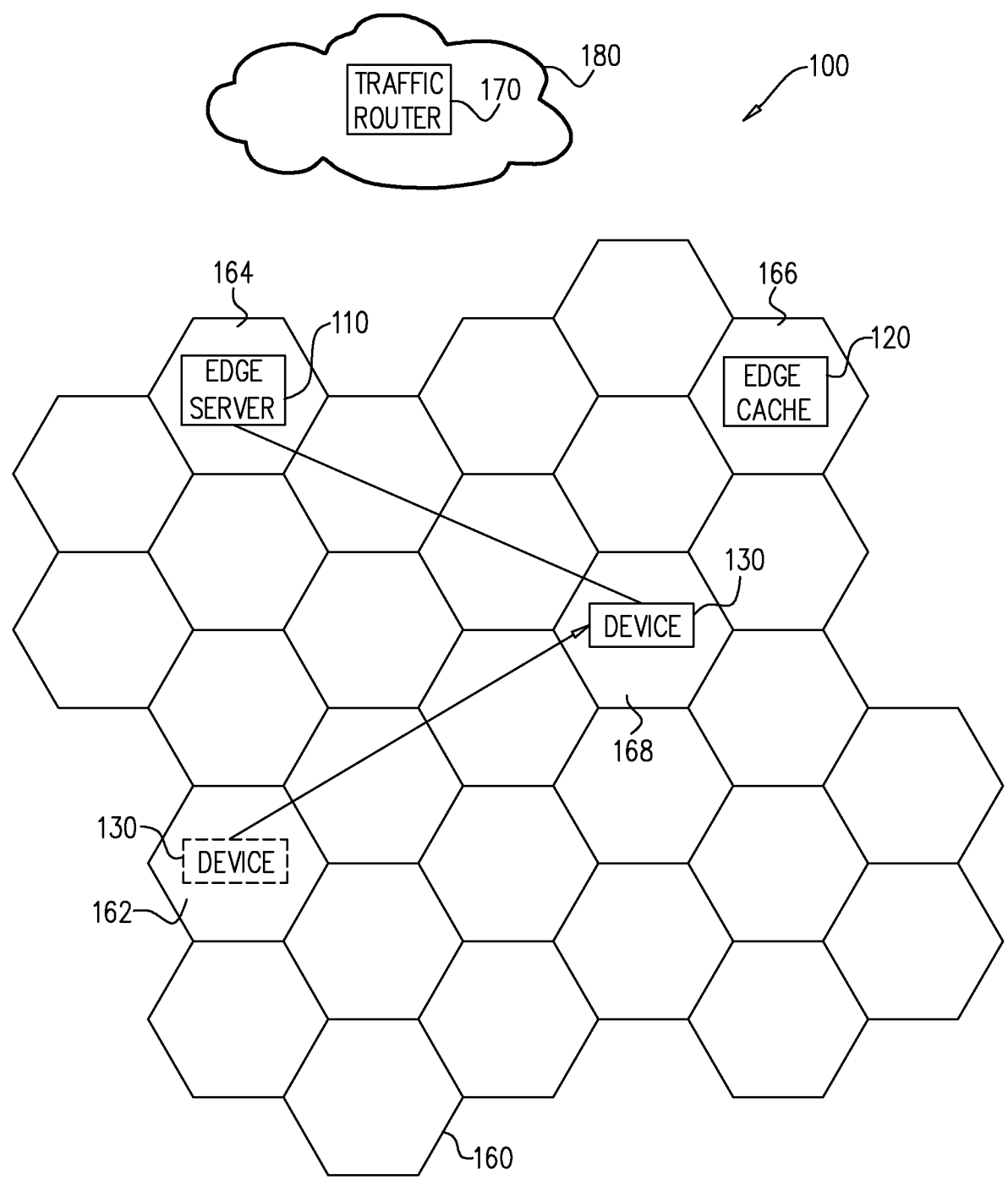
FIG. 2 is a simplified partly pictorial partly block diagram illustration of the first embodiment of the system of FIG. 1, at a second point in time.

Reference is now made to FIG. 2, which is a simplified partly pictorial partly block diagram illustration of the first embodiment of the system of FIG. 1, at a second point in time. The client device 130 has now moved from the first cell 162 to a new location, a fourth cell 168. The client device 130 shown in the first cell 162 is now depicted with a dotted line, indicating that the client device 130 is no longer located in the first cell 162. However, as is explained below, because the client device 130 began a streaming session while it was in the first cell 162, and is now located in fourth cell 168, (in which the client device 130 ordinarily may receive packets on a different WiFi or 5G network than the first cell 162) a different edge server (e.g., second edge server 120) other than first edge server 110 may be in a location from which content may be streamed more efficiently by the second edge server 120 to the client device 130.

If the client device 130 began viewing streaming content while on a Wi-Fi network, the traffic router 170 disposed at the CDN will assign the client device 130 to an edge server (first edge server 110 in the present example) based on the proximity of the Wi-Fi's access point to a content cache. Once the client device 130 leaves range of the Wi-Fi access point and moves into another range of a wireless access point (WAP) or onto a cellular network, the client device 130 will typically remain connected to the same edge server (i.e., first edge server 110). For example, in the case of a cellular device, based on the proximity of a cellular user plane to the CDN, the client device 130 may receive streamed content more efficiently from the second edge server 120 over the cellular network than from the first edge server 110.

Alternatively, if the client device 130 began viewing a live stream while on a cellular network, $5^{th}$ generation cellular technology (5G) allows placing the cellular user plane closer to subscriber client devices (e.g., client device 130) than was possible in earlier generations of cellular technology (sometimes referred to as the 5G control and user plane split (CUPS)). In earlier generations of cellular technology, video and other content provided by a CDN was limited to being provided from a location of the user plane.

As is known in the art, a "backhaul" portion of a CDN network comprises intermediate links of the CDN network core (also referred to as the CDN network backbone) and smaller subnetworks at the edge of the CDN network. When the client device 130 moves, the client device 130 typically connects to the first edge server 110 over a backhaul portion of the CDN network in order to access the first edge server 110, creating a hairpin (i.e., network traffic is routed back in the same direction as its point of origin) in the CDN network.

When the client device 130 initially connected to the first edge server 110, and sent an initial request for a connection in order to receive streaming content, the first edge server 110 records the Initial Client device 130 Internet Protocol (ICIP) address. The ICIP address may, in an embodiment using a version of HTTP or another protocol in which cookies are supported, be stored in a player application which is disposed in the client device 130 as a cookie (such as an HTTP cookie as defined in internet standard, *HTTP State Management Mechanism, RFC* 6265). The cookie will then be provided to the first edge server 110 with successive content requests. In another embodiment, for example, but not limited to an embodiment where a protocol which does not support cookies is in use, the ICIP can be stored at the first edge server 110 on one of a per-connection or a per-client basis (i.e., using per-connection or per-client session context, e.g., in session management tables of the first edge server 110, as will be understood by those of the art).

Listing 1, below, is an example of a method for connection marking, for an embodiment where the ICIP is recorded in an HTTP cookie. It is appreciated that for other protocols, as discussed above, other appropriate methods for connection marking could be used.

Listing 1 client1:~ $ curl -v http://edge.test.cdn.cisco.com/ > /dev/null
Trying 10.203.48.28...
* TCP_NODELAY set
* Connected to edge.test.cdn.cisco.com (10.203.48.28) port 80 (#0)
> GET / HTTP/1.1
> Host: edge.test.cdn.cisco.com
> User-Agent: curl/7.54.0
> Accept: */*
>
< HTTP/1.1 200 OK
< Date: Mon, 18 Sep 2017 18:29:47 GMT
< Server: ATS/5.3.2
< Last-Modified: Thu, 16 Oct 2014 13:20:58 GMT
< ETag: "1321-5058a1e728280"
< Accept-Ranges: bytes
< Content-Length: 4897
< Content-Type: text/html; charset=UTF-8
< Age: 2506
< Connection: keep-alive
< Via: http/1.1 eric-core-edge.cisco.com (ApacheTrafficServer/5.3.2 [uScMs f p eN:t cCMi p sS])
< Set-Cookie: omd_resite_cookie=ip_address:10.131.32.82; HttpOnly; Domain=edge.test.cdn.cisco.com In the 'set-cookie' instruction of Listing 1, the IP address of the client device (corresponding to client device 130) is given, for the sake of example, as 10.131.32.82. The request for content does not contain an HTTP cookie, and thus, signals that this request for content is a first request to the edge server (corresponding to first edge server 110). The edge server in Listing 1 records the ICIP using the Set-Cookie instruction, thereby setting the cookie, "omd_resite_cookie=ip_address:10.131.32.82".

Although not shown in Listing 1, the HTTP cookie may be combined with other OMD cookies (e.g., session tracking cookies). Additionally, such cookies may be digitally signed or protected with a keyed-hash message authentication code (HMAC), in order to ensure the integrity of the cookie. Furthermore, the edge server (e.g., first edge server 110)

may update the IP address of the client device in the cookie to reflect changes in the IP address of the client device. Such updating of the IP address of the client device in the cookie may prevent further redirections based on the changes in the IP address of the client device.

It is noted that the cookie of Listing 1 is limited in its scope to the edge server with which the client device is in communication (i.e., in the example of FIGS. 1 and 2, the first edge server 110), containing, as it does, the field, "Domain=edge.test.cdn.cisco.com", which identifies the edge server. Further, the cookie of Listing 1 is for the current session, and as such is short lived, and thus, unlikely to trigger redirections to other edge servers.

Figure 3:
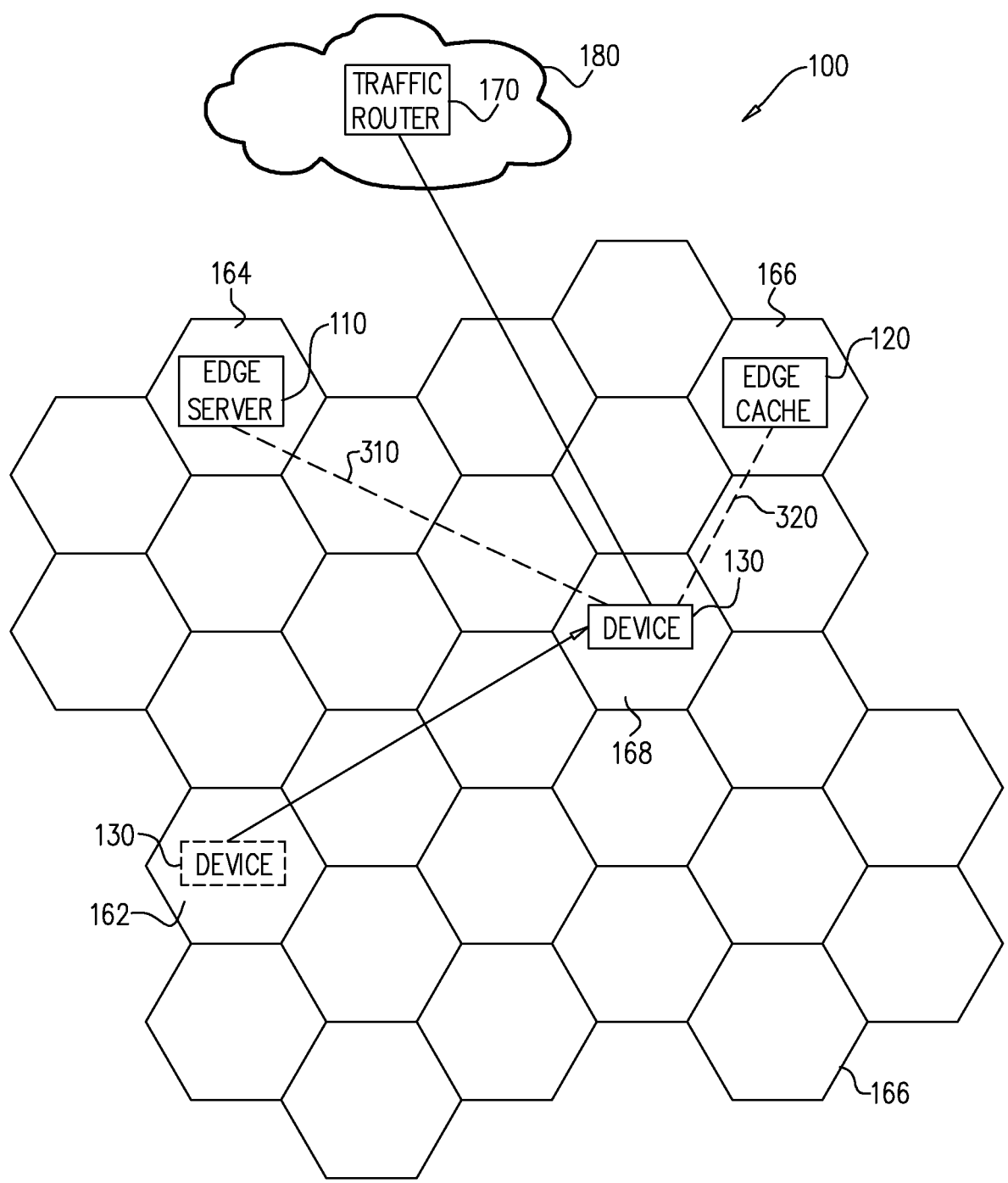
FIG. 3 is a simplified partly pictorial partly block diagram illustration of the first embodiment of the system of FIG. 1, at a third point in time.

Reference is now made to FIG. 3, which is a simplified partly pictorial partly block diagram illustration of the first embodiment of the system of FIG. 1, at a third point in time. In FIG. 3, the client device 130, having changed its location to the fourth cell 168, as shown in FIG. 2, now has a new IP address. For example, and as noted above, when the client device 130 was in the first cell 162 (as in FIG. 1), it might have been assigned an IP address from a first network. Now that the client device 130 has moved to a new location in the fourth cell 168 (as shown in FIG. 2), it will have been assigned a new IP address from a second network (as noted above, both the first network or the second network may be either a Wi-Fi network or a 5G network).

When the client device 130 now sends a request for content to the first edge server 110, the request will include a URL for the next content packets to be sent, and request headers (including the cookies as described above). The request will also comprise its socket 5-tuple of origin, which includes a set of five different values that comprise a Transmission Control Protocol/Internet Protocol (TCP/IP) connection, as is known in the art. The 5-tuple includes a source IP address and port number, destination IP address and port number and identify a protocol to use when processing the request.

When processing the request, the first edge server 110 will retrieve an Actual Client IP address (ACIP) from the 5-tuple and compare the ACIP to the ICIP from either the HTTP cookie or from the table where the server has itself recorded the ICIP. If the ICIP and the ACIP are the same, the first edge server 110 will serves the request as normal.

However, if the ICIP and the ACIP differ, the first edge server 110 will reply to the client device with an HTTP 302 redirect status code, as will be shown below, in Listing 2. The HTTP 302 redirect status code redirects the client device 130 back to the Traffic Router 170. Alternatively, the first edge server 110 may reply to the client device with an HTTP 301 permanent redirect status code or with an HTTP 307 temporary redirect status code. Other appropriate responses may be sent by the first edge server 110 may reply to the client device, depending on the protocol implemented, as well as other implementation and design considerations.

Dashed lines 310 and 320 in FIG. 3 indicate that the client device, in its new location in fourth cell 168, is now nearer to the second edge server 120 (a distance of three cells, including third cell 166 and fourth cell 168, as shown by dashed line 320), as opposed to the first edge server 110 (a distance of four cells, including second cell 164 and fourth cell 168, as shown by dashed line 310).

Listing 2

```
client1:~ $ curl -v -H "Cookie:
omd_resite_cookie=ip_address:10.98.70.99; HttpOnly;
Domain=edge.test.cdn.cisco.com" http://edge.test.cdn.cisco.com/
* Trying 10.203.48.28...
* TCP_NODELAY set
* Connected to edge.test.cdn.cisco.com (10.203.48.28) port 80 (#0)
> GET / HTTP/1.1
> Host: edge.test.cdn.cisco.com
> User-Agent: curl/7.54.0
> Accept: */*
> Cookie: omd_resite_cookie=ip_address:10.98.70.99; HttpOnly;
Domain=edge.test.cdn.cisco.com
>
< HTTP/1.1 302 Moved Temporarily
< Server: ATS/5.3.2
< Access-Control-Allow-Origins:*
< Location: http://tr.test.cdn.cisco.com/
< Content-Length: 0
< Date: Mon, 18 Sep 2017 19:24:06 GMT
< Age: 0
< Connection: keep-alive
< Via: http/1.1 eric-core-edge.cisco.com (ApacheTrafficServer/5.3.2
[uSc s f p eN:t c i p sS])
<
* Connection #0 to host edge.test.cdn.cisco.com left intact
```

In Listing 2, the edge server (corresponding to edge server 110) redirects the client device 130 to the Traffic Router 170. It is noted that in Listing 2, an HTTP 302 response was provided to the client device 130. It is appreciated that the redirection to the Traffic Router 170 may come in the form of a Domain Name System (DNS) query response (for DNS delivery services).

Figure 4:
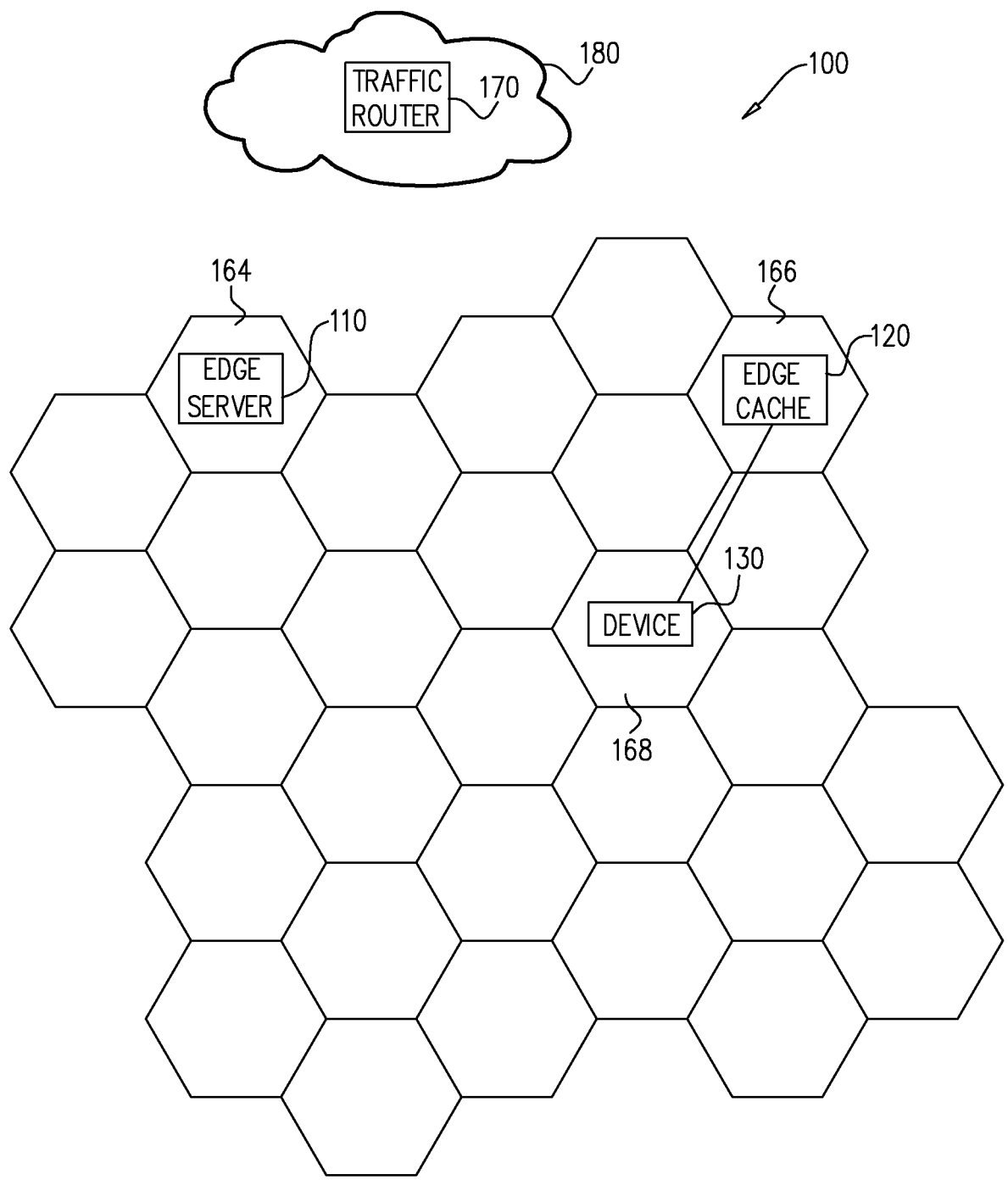
FIG. 4 is a simplified partly pictorial partly block diagram illustration of the first embodiment of the system of FIG. 1, at a fourth point in time.

Reference is now made to FIG. 4, which is a simplified partly pictorial partly block diagram illustration of the first embodiment of the system of FIG. 1, at a fourth point in time. In FIG. 4, the client device 130, having been redirected to the traffic router 170 and received a reanchoring to the second edge server 120, is now streaming packets via the second edge server 120.

In some embodiments, the first edge server 110 may make a redirection request to the traffic router 170 on behalf of the client device 130, providing the ACIP as a request parameter. A response of the traffic router 170 may then be sent via proxy directly to the client device 130, thereby avoiding an additional cumulative round-trip-delay time (RTT): (1) client device 130 to the first edge server 110 and back—this step may be avoided in some embodiments; and (2) client device 130 to the traffic router 170 and back; (3) client device 130 to the second edge server 120 and back. In this embodiment, there is no need to redirect the client device to the traffic router 170 with the first HTTP 302 redirection. Rather, an HTTP 302 redirection, or other appropriate response, may be sent from the traffic router 170 to the client device 130 in order to reanchor the client device 130 on the second edge server 120.

Additionally, if it turns out that despite the change in the client device's 130 IP address, the first edge server 110 is still better suited than any other edge server to provide cached content to the client device 130, the first edge server 110 may continue to send serve content to the client device 130. For example, if the client device moves from a 5G network while commuting to a Wi-Fi network after it's associated user's commute ends, while the client device 130 may now have a new IP address, the client device 130 may still be closer to the first edge server.

As discussed, the first edge server 110 and the second edge server 120 may comprise a traffic server, such as an Apache Traffic Server, as is known in the art. The Apache Traffic Server allows plug-ins, which may be written in C++, Lua, or other appropriate programming languages. By way of example, the handling of requests for content which are rerouted to the traffic router 170 for further handling, may be implemented as such a plug-in in the traffic server.

Figure 5:
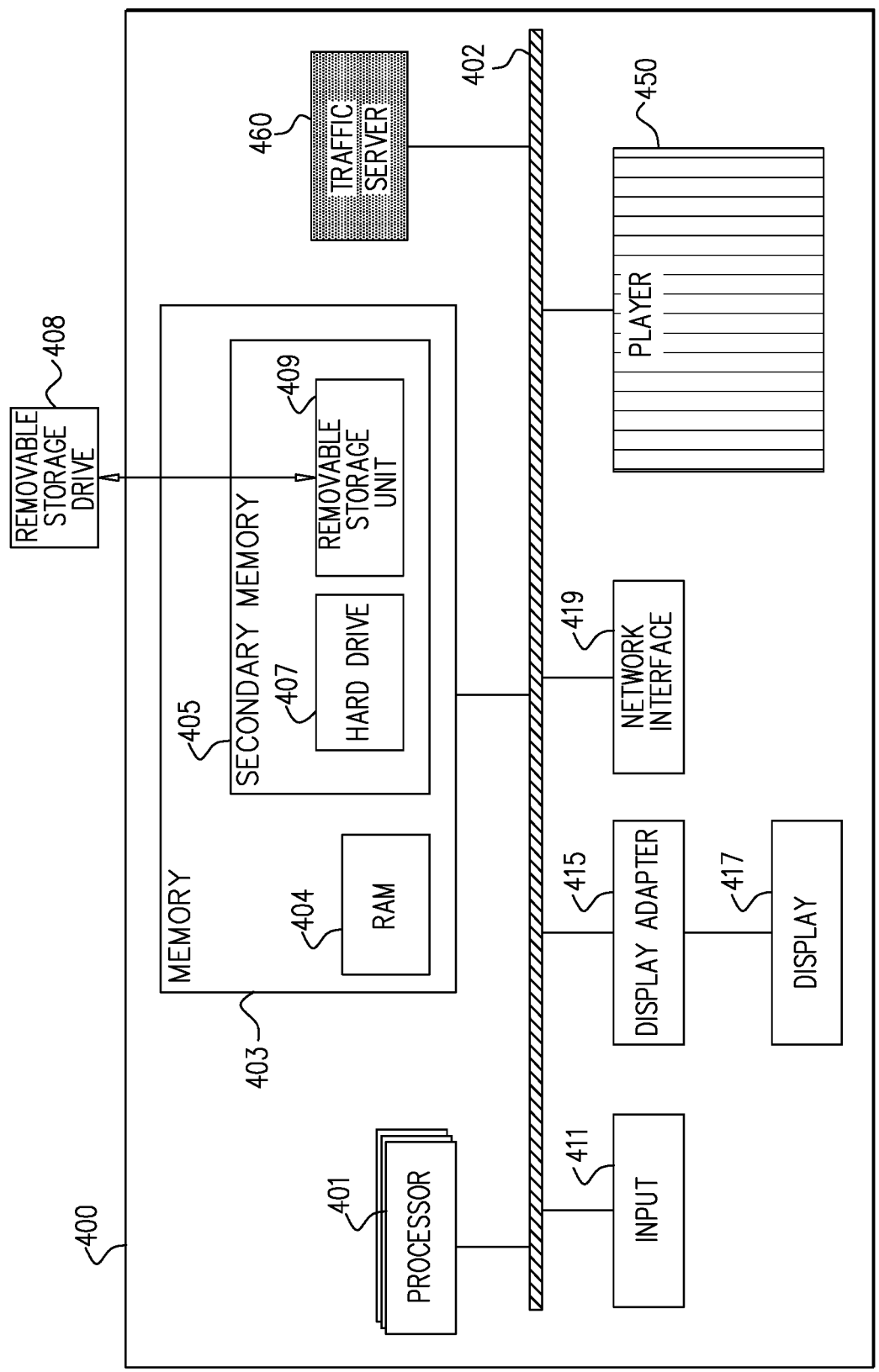
FIG. 5 is a block diagram of an exemplary edge server in one embodiment, and in a second embodiment, an exemplary client device comprising a player application for streaming content, for use in the system of FIG. 1.

Reference is now made to FIG. 5, which is a block diagram of an exemplary edge server 110 in one embodiment, and in a second embodiment, an exemplary client device 130 comprising a player application for streaming content, for use in the system 100 of FIG. 1.

The exemplary device 400 is suitable for implementing the systems, methods or processes described above. The exemplary device 400 comprises one or more processors, such as processor(s) 401, providing an execution platform for executing machine readable instructions such as software. One of the processor(s) 401 may be a special purpose processor operative to perform one or more of the methods for reanchoring client devices on servers described herein above. Processor(s) 401 comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the processor(s) 401 may be carried out by a programmable processor microprocessor or digital signal processor (DSP), executing suitable software. This software may be downloaded to the processor in electronic form, over a network, for example. Alternatively or additionally, the software may be stored on tangible storage media, such as optical, magnetic, or electronic memory media.

Commands and data from the processor(s) 401 are communicated over a communication bus 402. The exemplary device 400 also includes a main memory 403, such as a Random Access Memory (RAM) 404, where machine readable instructions may reside during runtime, and a secondary memory 405. The secondary memory 405 includes, for example, a hard disk drive 407 and/or a removable storage drive 408, representing a floppy diskette drive, a magnetic tape drive, a compact disk drive, a flash drive, etc., or a nonvolatile memory where a copy of the machine readable instructions or software may be stored. The secondary memory 405 may also include ROM (read only memory), EPROM (erasable, programmable ROM), EEPROM (electrically erasable, programmable ROM). In addition to software, data, such as HTTP statements, HTTP cookies, and HTTP tables, discussed herein throughout, and without limiting the generality of the foregoing, or other similar data, may be stored in the main memory 403 and/or the secondary memory 405. The removable storage drive 408 reads from and/or writes to a removable storage unit 409 in a well-known manner.

A user can interface with the exemplary device 400 via a user interface which includes input devices 411, such as a touch screen, a keyboard, a mouse, a stylus, and the like in order to provide user input data. A display adaptor 415 interfaces with the communication bus 402 and a display 417 and receives display data from the processor(s) 401 and converts the display data into display commands for the display 417.

A network interface 419 is provided for communicating with other systems and devices via a network. The network interface 419 typically includes a wireless interface for communicating with wireless devices in the wireless community. A wired network interface (e.g. an Ethernet interface) may be present as well. The exemplary device 400 may also comprise other interfaces, including, but not limited to Bluetooth, and HDMI. As noted above, the exemplary device may be adapted to communicate over a WiFi network or a 5G network, and comprise appropriate interfaces, drivers, software, and hardware, as is known in the art.

In one embodiment, exemplary device 400 may comprise a traffic server 460 (shown with dots in the background), such as the Apache Traffic Server, mentioned briefly above. The secondary memory 405 may include storage where content is cached (for instance, on hard drive 407). In such an embodiment, the exemplary device of FIG. 5 may depict the first edge server 110 and/or the second edge server 120 of FIG. 1. In an alternative embodiment, exemplary device 400 may comprise a client device 130, and may include a player application 450 (shown with vertical stripes).

It will be apparent to one of ordinary skill in the art that one or more of the components of the exemplary device 400 may not be included and/or other components may be added as is known in the art. The exemplary device 400 shown in FIG. 5 is provided as an example of a possible platform that may be used, and other types of platforms may be used as is known in the art. One or more of the steps described herein may be implemented as instructions embedded on a computer readable medium and executed on the exemplary device 400. The steps may be embodied by a computer program, which may exist in a variety of forms both active and inactive. For example, the one or more of the steps may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download.

Figure 6:
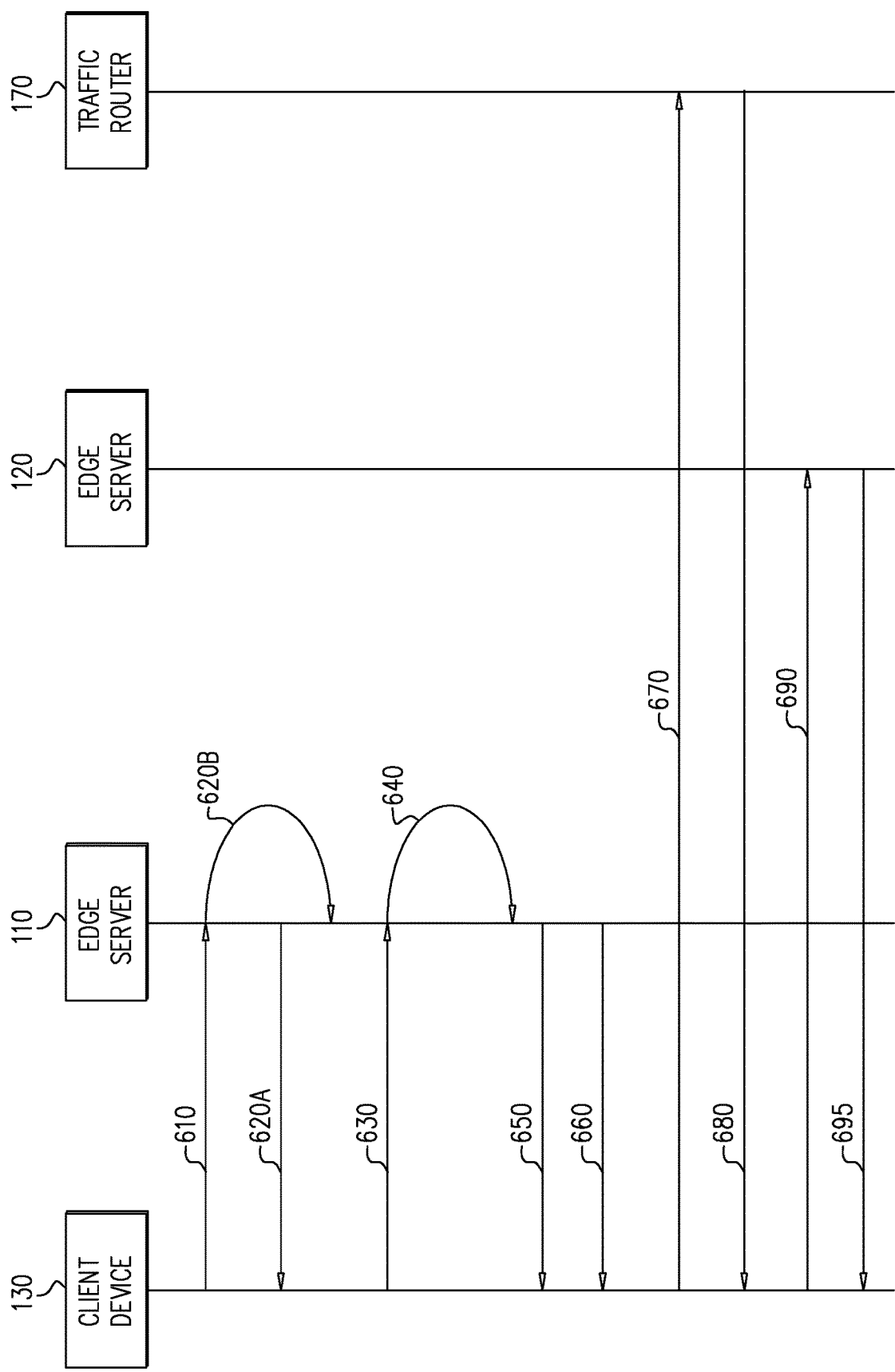
FIG. 6 is a data flow diagram of an embodiment of a method for use in the system of FIG. 1.

Reference is now made to FIG. 6, which is a data flow diagram of an embodiment of a method for use in the system of FIG. 1. At step 610 the client device 130 establishes communications with the first edge server 110, and requests streaming content. At step 620A the first edge server 110 may record the ICIP in a cookie sent to the client device 130. Alternatively, in step 620B, the first edge server 110 may record the ICIP in its internal session tables. At step 630, the first edge server 110 receives a request (such as an HTTP request) to access a URL in order to receive more packets of streamed content. The request includes the ACIP. At step 640, a processor, such as processor 401 (FIG. 5) at the first edge server 110 compares the ACIP to the ICIP.

If, the ACIP and the ICIP are the same, at step 650 the first edge server 110 replies by sending the requested packets of streaming content to the client device, and operation returns to step 630 when the client device 130 requests more packets of streaming content. Steps 660-695 are omitted.

If, however, the ACIP and the ICIP are not the same, at step 660, the first edge server 110 replies by sending an HTTP 302 redirection (or other protocol-appropriate redirection, as described above) to the client device 130, said HTTP 302 redirection redirecting the client device to the traffic router (as noted above, in some embodiments, the first edge server 110 directly communicates with the traffic router 170 at this step).

At step 670, the client device 130 requests that the traffic router 170 direct it to an edge server which is better situated to provide streaming content. The traffic router 170 in the Cisco OMD system, mentioned above, is operative to receive requests from a plurality of client devices, among them the client device 130, and to direct the client devices to appropriate edge servers based on geolocation, edge server availability, edge server load, and edge server cache content in order to effect efficient system wide load balancing.

At step 680, the traffic router 170 sends an HTTP 302 redirection (or other protocol-appropriate redirection, as described above) to the client device 130 directing the client device 130 to send future requests for content to the second edge server 120. At step 690, the client device 130 establishes communications with the second edge server 120, and requests the packets of streaming content. At step 695, the second edge server 120 responds to the request by providing the packets of streaming content. It is appreciated that the second edge server 120 will record the ICIP either in a cookie or in its session tables, as above, in steps 620A and/or 620B.

Figure 7:
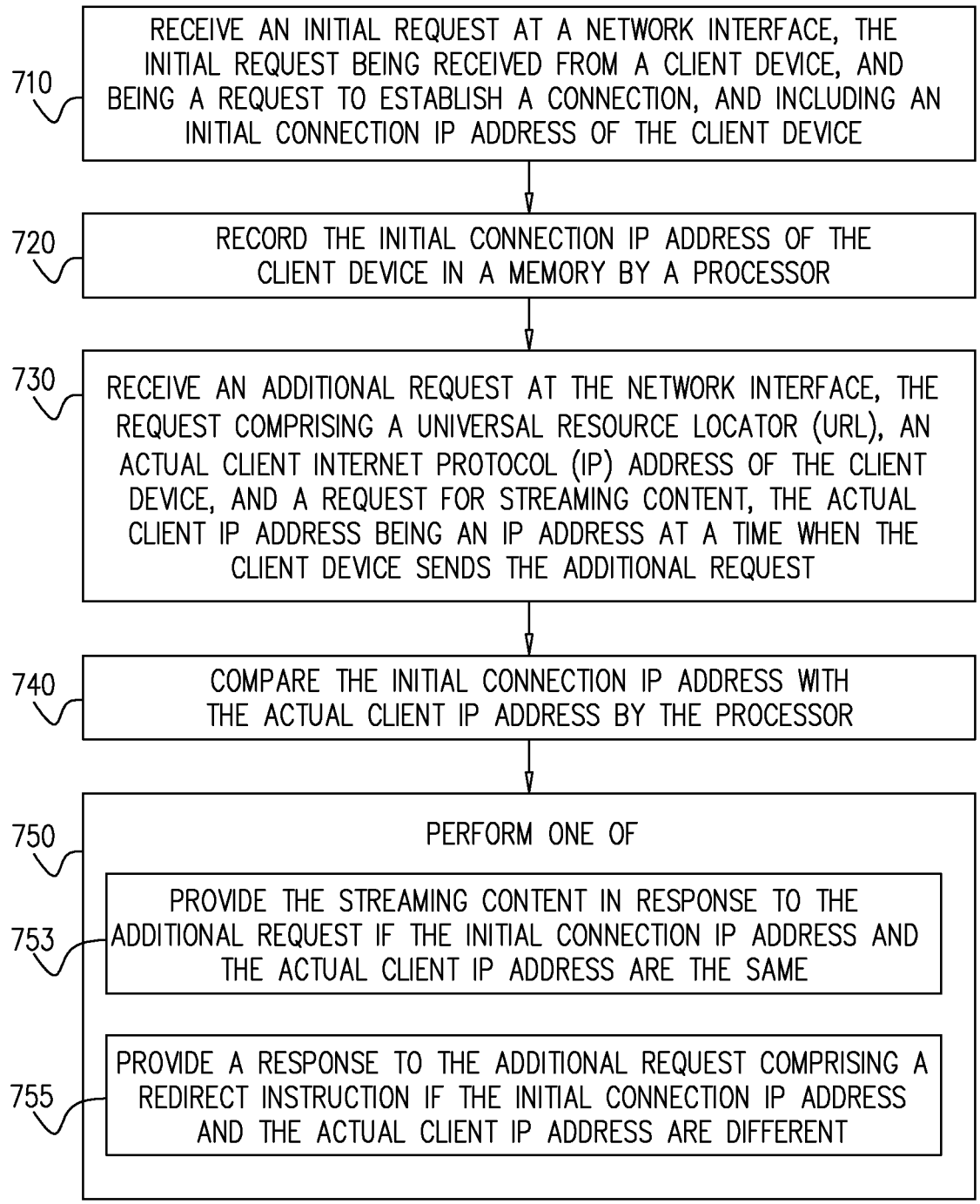
FIG. 7 is a flowchart of an exemplary method for use in the system of FIG. 1.

Reference is now made to FIG. 7, which is a flowchart of an exemplary method for use in the system of FIG. 1. At step 710, an initial request is received at a network interface of the edge server 120 (FIG. 1), the initial request being received from a client device, and being a request to establish a connection, and including an initial connection IP address of the client device. At step 720 the initial connection IP address of the client device is recorded by a processor in one of a cookie or a memory at the edge server 120 (FIG. 1). At step 730 an additional request is received at the network interface of the edge server 120 (FIG. 1), the additional request comprising a universal resource locator (URL), an actual client Internet protocol (IP) address of the client device, and a request for streaming content, the actual client IP address being an IP address at a time when the client device sends the additional request. At step 740, the initial connection IP address is compared by the processor with the actual client IP address. At step 750, on of the following is performed: the streaming content is provided in response to the additional request if the initial connection IP address and the actual client IP address are the same (step 753); or a response to the additional request is provided comprising a redirect instruction if the initial connection IP address and the actual client IP address are different.

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of embodiments which are, for clarity, described in the contexts of separate embodiments may also be provided in combination in a single embodiment. Conversely, various features of embodiments which are, for brevity, described in the context of a single embodiment may also be provided separately or in any suitable subcombination.

It will be appreciated by persons skilled in the art that embodiments described herein are not limited by what has been particularly shown and described hereinabove. Rather the scope of embodiments are defined by the appended claims and equivalents thereof.

What is claimed is:

1. A system comprising:
   a processor;
   a memory for storing data to be used by the processor;
   a network interface operative to receive and send network communications, the network interface being operative to:
      receive an initial request from a client device to establish a connection, the initial request comprising at least an initial connection Internet protocol (IP) address of the client device, wherein the initial connection IP address is recorded in a cookie to be sent by the network interface to the client device;
      receive an additional request comprising an actual client IP address of the client device, and a request for streaming content, the actual client IP address being an IP address at a time when the client device sends the additional request; and
      send a reply to the client device;
   the processor being operative to:
      record the initial connection IP address of the client device;
      compare the initial connection IP address with the actual client IP address; and
      perform one of:
         provide the streaming content in response to the additional request if the initial connection IP address and the actual client IP address are the same; or
         provide a response to the additional request to the client comprising a redirect instruction if the initial connection IP address and the actual client IP address are different.

2. The system according to claim 1 wherein a subsequent connection request from the client device comprises the cookie.

3. The system according to claim 1 wherein the cookie is combined with at least one Open media Distribution cookie.

4. The system according to claim 1 wherein the cookie comprises at least one of a digital signature or a keyed-hash message authentication code (HMAC).

5. The system according to claim 1 wherein the cookie comprises at least one field for preventing redirect loops.

6. The system according to claim 1 wherein the initial connection IP is recorded in a record on one of a per-connection or a per-client basis at the edge server.

7. The system according to claim 1 and wherein the processor is further operative to implement redirection loop prevention.

8. The system according to claim 1 wherein the redirect instruction comprises an HTTP redirection.

9. The system according to claim 1 wherein the redirect instruction comprises a redirection of the client device to a traffic router.

10. A method comprising:
    receiving an initial request at a network interface, the initial request being a request to establish a connection received from a client device, and including an initial connection Internet Protocol IP address of the client device, wherein the initial connection IP address is recorded in a cookie to be sent by the network interface to the client device;

recording the initial connection IP address of the client device in a memory by a processor;

receiving an additional request at the network interface, the additional request comprising a universal resource locator (URL), an actual client IP address of the client device, and a request for streaming content, the actual client IP address being an IP address at a time when the client device sends the additional request;

comparing the initial connection IP address with the actual client IP address by the processor;

performing one of:

providing the streaming content in response to the additional request if the initial connection IP address and the actual client IP address are the same; or providing a response to the additional request comprising a redirect instruction if the initial connection IP address and the actual client IP address are different.

11. The method according to claim 10 wherein a subsequent connection request from the client device comprises the cookie.

12. The method according to claim 10 wherein the cookie is combined with at least one Open media Distribution cookie.

13. The method according to claim 10 wherein the cookie comprises one of a digital signature or a keyed-hash message authentication code (HMAC).

14. The method according to claim 10 wherein the cookie comprises at least one field for preventing redirect loops.

15. The method according to claim 10 wherein the initial connection IP is recorded in a record on one of a per-connection or a per-client basis at the edge server.

16. The method according to claim 10 and further comprising implementing redirection loop prevention.

17. The method according to claim 10 wherein the redirect instruction comprises at least one of: an HTTP redirection; or a redirection of the client device to a traffic router.

18. A non-transitory computer-readable medium including contents that are configured to cause a computing system to perform a method comprising:

receiving an initial request at a network interface, the initial request being a request to establish a connection received from a client device, and including an initial connection Internet Protocol (IP) address of the client device, wherein the initial connection IP is recorded in a cookie to be sent by the network interface to the client device;

recording the initial connection IP address of the client device in a memory by a processor;

receiving an additional request at the network interface, the additional request comprising a universal resource locator (URL), an actual client IP address of the client device, and a request for streaming content, the actual client IP address being an IP address at a time when the client device sends the additional request;

comparing the initial connection IP address with the actual client IP address by the processor;

performing one of:

providing the streaming content in response to the additional request if the initial connection IP address and the actual client IP address are the same; or providing a response to the additional request comprising a redirect instruction if the initial connection IP address and the actual client IP address are different.

19. The non-transitory computer-readable medium according to claim 18 wherein a subsequent connection request from the client device comprises the cookie.

20. The non-transitory computer-readable medium according to claim 18 wherein the cookie is combined with at least one Open media Distribution cookie.

* * * * *